United States Patent Office 3,026,293
Patented Mar. 20, 1962

3,026,293
ACRYLAMIDIC GRAFT COPOLYMERS AND THEIR PREPARATION
John R. Caldwell and Harry W. Coover, Jr., Kingsport, Tenn., assignors to Eastman Kodak Company, Rochester, N.Y., a corporation of New Jersey
No Drawing. Continuation of application Ser. No. 444,648, July 20, 1954. This application Aug. 6, 1959, Ser. No. 831,942
6 Claims. (Cl. 260—45.5)

This invention relates to graft copolymers of the type wherein one or more monomeric materials are polymerized in admixture with a preformed homopolymer or interpolymer, and is particularly concerned with the preparation of acrylamidic graft copolymers wherein a major portion of the preformed polymer is an acrylamidic monomer in polymerized form.

A large number of polymeric materials have been prepared in the past, including homopolymers, interpolymers, and more recently graft copolymers. The homopolymers are prepared by polymerizing a single polymerizable monomer containing at least one —CH=C< group. Usually the homopolymers are polymers obtained by polymerizing a vinylic monomer which is an olefinic material containing a single ethylenic group of this kind. The interpolymers include copolymers which are prepared by simultaneously copolymerizing a mixture of olefinic monomers which can be either two vinylic monomers, or a vinylic monomer and a diolefinic monomer, or two diolefinic monomers. Terpolymers are prepared by simultaneously polymerizing an admixture of three such polymerizable olefinic monomers. Graft copolymers are prepared by polymerizing one or more olefinic monomers in admixture with a preformed homopolymer or interpolymer, whereby a directed structural configuration in the polymer molecule is obtained in contrast to the random distribution obtained in interpolymers by simultaneous polymerization of two or more monomers. In graft copolymerization, a single olefinic monomer can be polymerized with the preformed polymer, or a mixture of olefinic monomers, including either or both vinylic and diolefinic monomers, can be polymerized with the preformed polymer. The graft copolymerization can take place with the preformed polymer directly in the polymerization reaction mixture in which the preformed polymer is formed and from which it has not been isolated, in which case the preformed polymer is designated as a "live" polymer. Alternatively, the preformed polymer can be isolated from its polymerization mixture, and such isolated polymers are designated as "dead" polymers. The graft copolymers appear to have an integral polymer structure since, unlike mixtures of polymers, the components cannot be separated by solvent partition or other means ordinarily employed for separating mixtures of polymers. As a consequence, the graft copolymers possess properties quite unlike mixtures of polymers, and also quite unlike the properties of interpolymers prepared by simultaneous polymerization of the various monomers entering into the polymeric compounds.

One of the primary advantages of the synthetic polymeric materials over naturally occurring materials is the fact that the chemical constitution and structural configuration can be controlled to a certain extent to give the desired properties to the resulting polymers. Usually, however, the properties cannot be predicted accurately in advance, and hence the preparation of polymeric materials is largely an empirical science. Prior to this invention, attempts have been made to prepare polymeric materials which would have the property of transmitting water vapor freely without at the same time allowing the passage of liquid water. The utility of such a material is obvious, since such a material would furnish waterproof films which could "breathe" in a manner analogous to the usual textile fabrics. Most polymeric film-forming materials which exhibit water resistance are highly impervious to water vapor also and hence have limited utility in the preparation of wearing apparel because of discomfort. Another property of such materials which is desirable is that they be flexible and retain their flexibility even after prolonged exposure to liquid water. Attempts have been made to polymerize polyvinyl alcohol films to give flexibility and to cross-link the films to give water insolubility. Such films will transmit water vapor, but the plasticizer is usually leached from the film by contact with liquid water or aqueous solutions, and a brittle, inflexible product is obtained when the film is dried.

In addition to polymeric materials which will transmit water vapor while retaining liquid water, it is desirable to prepare polymeric films which have the ability of absorbing water whereby the film is swelled without being completely washed away. Such polymers would find particular utility in the photographic arts where they would function in much the same manner as does gelatin, as well as in the textile and paper sizing arts.

It is accordingly an object of this invention to provide new and improved polymeric materials which have unusual solubility and vapor transmission characteristics and which are capable of remaining flexible even after prolonged exposure to liquid water or aqueous solutions.

It is a further object of the invention to prepare improved polymers which freely transmit water vapor without permitting the passage of liquid water, and which form strong, flexible films having excellent abrasion resistance and wearing qualities.

Another object of the invention is to provide a new type of graft copolymers involving an acrylamidic preformed polymer graft polymerized with certain monomeric materials as defined herein in particular ranges of proportions of the various components whereby highly unusual and highly useful properties are obtained which could not be satisfactorily obtained with the polymers known to the art prior to this invention.

Another object of this invention is to provide improved polymeric materials which offer unusual advantages in the textile coating, the paper sizing, flexible film and photographic arts.

Other objects will be apparent from the description and claims which follow.

These and other objects are attained by means of this invention, which comprises providing polymeric material having the desirable properties described hereinabove by graft copolymerizing a mixture of (1) 20–80% by weight of preformed polymeric material composed of combined monomeric material which consists of (a) 70–100% by weight of at least one acrylamidic monomer of the formula

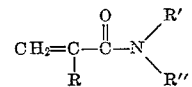

wherein R is either hydrogen or a methyl group and R' and R" are either hydrogen or alkyl groups containing 1 to 4 carbon atoms, and (b) 30–0% by weight of at least one other polymerizable vinylic monomer having a single ethylenic unsaturation, with (2) 80–20% by weight of polymerizable olefinic monomeric material which includes 60–100% by weight of one or more unhalogenated polymerizable olefinic monomers, other than an acrylamidic monomer as defined hereinabove, and which are characterized by containing at least one olefinic unsaturation of the type —CH=C<, and which are free of multiple linkages other than olefinic linkages of this type or carbonylic linkages of the type $$-\overset{\overset{O}{\|}}{C}-$$

The polymeric materials which correspond in chemical constitution and structural configuration to the graft copolymers thus obtained possess unusual and highly advantageous properties. The polymers which contain from 20% to 60% of the preformed polymeric material (containing 70–100% by weight of combined acrylamidic monomer) are especially valuable in the preparation of films which freely transmit water vapors but which do not permit the passage of liquid water. Polymers of the invention containing higher amounts of preformed polymers up to 80% by weight of the entire graft polymer have the property of being swelled by water or aqueous solutions and hence are excellent water-dispersible colloids which are very useful as gelatin substitutes, extenders or additives, or as thickening agents or sizing agents. The polymers of the invention can be readily prepared directly in the form of a smooth emulsion which can be employed for coating or film casting applications, or they can be prepared in dried form suitable for molding or shaping into any of the shaped objects commonly prepared from polymeric materials. The dried polymers are also capable of being dissolved in a suitable organic solvent to form dopes or of being redispersed into aqueous emulsions. The polymers can also be treated with a hardening or cross-linking agent for the acrylamidic polymer whereby the water insolubility is increased as well as being graft polymerized in the presence of the divinyl cross-linking agent for the portion of the polymer polymerized during the grafting step whereby insolubility in the common organic solvents is obtained. It is thus apparent that the polymeric materials of this invention can be used for a wide variety of applications, and that the solubility characteristics as regards both water and organic solvents, as well as the water vapor transmitting characteristics, can be varied over a wide range in accordance with the desired properties in the product.

Particularly useful polymeric materials result from graft copolymerizing a mixture of (1) 20–80% by weight of preformed polymers composed of combined monomeric material consisting of (a) 70–100% by weight of one or more acrylamidic monomers as defined and (b) 30–0% by weight of one or more vinylic monomers with (2) 80–20% by weight of polymerizable olefinic monomer or monomers including 60–100% by weight of one or more alkyl acrylates resulting from esterifying acrylic acid with an aliphatic alcohol of 1–8 carbon atoms, or a diolefinic monomer containing the group $$H_2C=C-C=CH_2$$

In addition to the acrylate or diolefinic monomer or monomers, up to 40% by weight based on the total weight of the olefinic monomers employed in the grafting step, of one or more other polymerizable vinylic monomers can be employed. The polymers wherein the acrylate monomer is employed in the grafting step are of particular utility in the formation of films wherein a high differential between the water vapor and liquid water transmission rates is desired. The polymers containing the diolefinic monomer are particularly advantageous because of their rubbery flexible properties and hence are desirably employed in applications wherein resistance to abrasion is of particular importance.

In the polymers of this invention, at least 60% by weight of the grafting monomer or monomers (i.e. the monomers employed for graft copolymerizing with the preformed polymer), are unhalogenated, are not acrylamidic monomers as defined hereinabove, contain at least one olefinic or ethylenic unsaturation, and contain no multiple linkages other than olefinic and carbonylic linkages. It will be understood that the reference to carbonylic linkages does not infer the presence of a ketoor aldehydro- oxygen but also refers to the carbonylic linkage of an amide, carboxylic acid or carboxylate ester. Halogenated monomers such as vinyl chloride and vinylidene chloride as well as monomers containing other multiple cyano linkages, such as acrylonitrile or similar vinyl compounds, can be used in amounts up to 40% of the total weight of the grafting monomers. Similarly, the minor constituent of the grafting monomers, when a mixture of monomers is employed, can be an acrylamidic monomer such as an acrylamide or a methacrylamide, and including the N-alkylated as well as the N,N-dialkylated acrylamides and methacrylamides.

Although the acrylate monomers and the diolefinic monomers possess particular utility in the preparation of the polymers of this invention, highly useful compositions can be prepared without employing either of these types of monomers or by using such monomers in minor amounts. Thus, for example, any desired portion of the grafting monomers can be an ethylenically unsaturated monocarboxylic acid which is polymerizable or interpolymerizable, and including such acids as acrylic acid, methacrylic acid, maleic acid, fumaric acid, itaconic acid, citraconic acid, and similar unsaturated acids, as well as the amides, alkyl esters, amates, and similar polymerizable derivatives of these and other polymerizable unsaturated carboxylic acids. The minor constituents which can be employed also include the vinyl esters of these and similar aliphatic carboxylic acids containing 2 to 10 carbon atoms, vinyl ethers, vinyl ketones, vinyl pyridines, aryl compounds such as the styrene and substituted styrenes, N-vinyl imides, N-vinyl lactams, as well as polymerizable hydrocarbons such as ethylene, isobutylene, and the like.

The preformed polymer used in preparing the graft copolymers of the invention forms from 20 to 80% of the total weight of the graft copolymer, and from 70 to 100% of the weight of this preformed polymer consists of one or more acrylamidic monomers, in the polymerized form, of the formula $$CH_2=C-\overset{\overset{O}{\|}}{C}-N\overset{R'}{\underset{R''}{\diagdown}}$$
$$\phantom{CH_2=}|\phantom{\overset{\overset{O}{\|}}{C}-N}$$
$$\phantom{CH_2=}R$$

wherein R is either hydrogen or a methyl group and R' and R'' are either hydrogen or alkyl groups of 1 to 4 carbon atoms. Typical examples of acrylamidic monomers suitable for use in practicing the invention are acrylamide, N-methyl acrylamide, N-ethyl acrylamide, N-butyl acrylamide, N,N'-dimethyl acrylamide, N-isopropyl acrylamide, methacrylamide, N-methyl methacrylamide, N-propyl methacrylamide, N-isobutyl methacrylamide, and N,N-diethyl methacrylamide, and similar derivatives of acrylamide and methacrylamide. In practicing the invention, a single acrylamidic monomer can be used or mixtures of two or more acrylamidic monomers as defined can be used in preparing the preformed polymer.

The preformed polymer can consist entirely of polymerized acrylamidic monomers or can contain up to 30% of the weight of preformed polymer of a different vinylic monomer containing a single ethylenic unsaturation. A large number of such vinylic monomers are specifically described herein, and it will be understood that any one or more of the vinylic monomers containing a —CH=C< group can be used.

The preformed polymer can be prepared in any well known manner as, for example, by dissolving or dispersing the monomer or monomers to be employed in forming the polymer in water or in a suitable organic solvent and adding a polymerization catalyst to the dispersion. The polymerization can thereafter be effected at temperatures varying from room temperature to the reflux temperature of the reaction mixture. Ordinarily, a temperature of from 25° to 75° C. is sufficient. The preparation of the preformed polymer is thus carried out in accordance with usual practice. Any of the polymerization catalysts can be employed including the well known per-catalysts such as benzoyl peroxide, acetyl peroxide, lauryl peroxide, triacetone peroxide, urea peroxide, t-butyl hydroperoxide, hydrogen peroxide, alkali metal perborates such as sodium and potassium perborate, persulfates such as alkali metal or ammonium persulfates, alkyl percarbonates, as well as such catalysts as the ketazines, azines, and the like, and including materials such as azo-bis-isobutyro nitrile. The quantity of catalyst employed can be varied in accordance with usual polymerization practices depending upon the nature and ratio of reactants, the reaction conditions, and similar variable factors.

The polymerization can be carried out advantageously in aqueous medium, although aqueous solvents such as aqueous acetone or the like can be used with satisfactory results. The polymerization can be either in emulsion or in solution, and the term "dispersion polymerization" is intended to include either of these variations. The acrylamidic monomers are readily soluble in water, and the particular polymerization system will depend upon whether or not one or more other monomers are used and the nature of such monomers. Following the polymerization, the acrylamidic polymer thereby obtained can be isolated from the polymerization reaction mixture and used in the form of a dead preformed polymer in the subsequent grafting stage, or the preformed polymer can be left in the polymerization reaction mixture and the grafting monomer added directly thereto, whereby polymerization is effected with a live preformed polymer. It will be understood, that any of the polymerization adjuncts commonly employed such as emulsifiers, chain length regulators, and similar polymerization aids can be employed in accordance with usual practice. In carrying out the polymerization, up to 30% by weight of the monomeric material employed in forming the preformed polymer can be one or more vinylic monomers such as the polymerizable unsaturated carboxylic acids, their amides, esters, amates, and the like, as well as the vinyl derivatives of benzene such as the styrene and substituted styrene monomers, the vinyl pyridines, including the alkyl substituted vinyl pyridines, the vinyl ethers, vinyl ketones, acrylonitrile monomers such as acrylonitrile itself or a substituted acrylonitrile such as methacrylonitrile, vinyl chloride, vinylidene chloride, or any of the other well known vinylic monomers.

In accordance with this invention, from 20 to 80 parts by weight of the preformed acrylamidic polymer is then graft copolymerized with from 80 to 20 parts by weight of grafting monomer or monomers. The polymerization during the grafting step is effected in accordance with well known polymerization practice as described in connection with the preparation of the preformed polymer. Thus the graft copolymerization can be carried out in an organic solvent using an isolated preformed polymer, or it can be carried out directly in the reaction mixture in which the preformed polymer was formed, regardless of whether such mixture is aqueous or organic in nature. It is preferred to carry out the graft copolymerization in aqueous media whereby a smooth emulsion is obtained which can be used directly for coating textiles, paper, leather, or the like, or used for depositing films of the polymer. In this regard, the preformed polymer is readily dispersed in water and hence an isolated polymer can be used in this manner. If desired, a promoter such as potassium sulfite or potassium bisulfite can be added to the polymerization mixture to increase the speed of reaction. The water soluble catalysts such as sodium persulfate, potassium persulfate, sodium perborate, hydrogen peroxide or similar per-catalysts are desirably employed in amounts of from 0.05% to 3.0%, and preferably from 0.5% to 1.0% based on the total weight of grafting monomers. The polymerization is desirably effected by agitating the polymerization mixture at a temperature of 30–120° C., and preferably at 50–75° C. for a period of 3 to 12 hours. The graft copolymerization, as well as the formation of preformed polymers, can be carried to completion or can be stopped before complete polymerization has been effected as desired.

The graft copolymerization is desirably carried out in aqueous solution wherein the concentration of preformed polymer is from 5 to 30%. Emulsifying agents such as the sodium salts of fatty alcohol sulfates, aromatic sulfonates, soaps and the like can be used but are not essential in most cases.

As has been described, particularly advantageous results are obtained when 60–100% of the grafting monomer consists of either one or more alkyl acrylates or one or more diolefins. As is described hereinbelow and shown in the examples of preferred embodiments, any of the other olefinic monomers and desirably the vinylic monomers can be used, with 60 to 100% of the grafting monomer being unhalogenated and containing no multiple linkages other than olefinic or carbonylic linkages.

It is sometimes desirable to increase the resistance of the vinyl polymer to organic solvents, particularly when the polymer is to be employed in coating textiles, leather or the like. This can be readily accomplished by effecting the graft copolymerization in the presence of 1–15% by weight of a cross-linking agent based on the total weight of grafting monomer. The cross-linking agent employed is desirably a divinyl material such as divinyl benzene, allyl acrylate, dallyl phthalate, or similar material containing two vinyl groups whereby cross-linking in the polymer results. Such dinvinyl cross-linking agents are well known in the art, and it is intended that this inventon shall include the use of any of such materials.

It is also desirable in many cases to harden the polymer to increase its water insolubility. This is true particularly when the polymer is to be employed in an application where water vapor transmission is desired, without passage of liquid water, and without objectionable swelling of the polymeric film. This hardening of the graft copolymer is readily accomplished by incorporating from 0.5% to 15.0% by weight based on the weight of the preformed polymer of a cross-linking agent or hardening agent for acrylamide polymers into the dispersion of graft copolymer before use. A large number of hardening or cross-linking agents for acrylamide polymers are known, and any of these materials can be employed. Suitable materials which are typical include formaldehyde, methylol ureas, methylol melamines, zirconium salts, polybasic acids, and the like. Best results are obtained with amounts of hardening agent of from 2% to 10% by weight based on the weight of the preformed polymer. The smooth, viscous emulsion or cream containing the graft copolymer and obtained as a product of the graft copolymerization can be used directly for coating, extruding, dipping, or the like. Evaporation of the emulsion leaves a clear, flexible, tough film. The emulsion can be coated on fabrics, leather, paper or other surfaces by the usual methods employing rolls or doctor blades. For the preparation of waterproof fabrics or leather from 0.6 to 6 oz. per square yard, and preferably from 1.5 to 3.0 oz. per square yard is used. The coated article can then be dried at 100–120° C. The dispersions can also contain any of the usually employed ingredients, including fire retarding agents such as tricresyl phosphate, triphenyl phosphate, chloroethyl phosphate, or the like, as well as pigments such as titanium dioxide, clay, carbon black, lead chromate, or the like.

When the preformed polymer is not readily soluble in water, it may be desirable to carry out the graft copolymerization in an organic solvent. For this purpose, the lower alcohols such as methyl, ethyl, propyl, or butyl alcohol, alcohol-ether mixtures, dioxane, or similar solvents or solvent mixtures can be used. In this case, the graft copolymer is obtained in the form of a dope or solution in the solvent, and this dope or solution can be used for coating textiles, leather, and the like in the same manner as the aqueous dispersions.

The acrylate esters which are preferably employed in practicing the invention include any of the esters obtained by esterifying acrylic acid with an aliphatic alcohol of 1 to 8 carbon atoms. Thus, for example, typical acrylic esters derived from either straight or branched-chain alcohols include methyl acrylate, ethyl acrylate, propyl acrylate, n-butyl acrylate, sec-butyl acrylate, isobutyl acrylate, n-amyl acrylate, isoamyl acrylate, cyclohexyl acrylate, 2-ethylhexyl acrylate, and the like. The acrylic esters of ether-alcohols are also useful, as, for example, the acrylic esters of the monoethyl ether of ethylene glycol, the acrylic ester of the monomethyl ether of ethylene glycol, the acrylic ester of the monomethyl ether of diethylene glycol, and the like.

When a rubbery polymer is desired, the grafting monomer can include a diolefinic monomer such as butadiene, isoprene, 2,3-dimethyl butadiene, 2-chloro butadiene, 2-cyano butadiene, 2-phenyl butadiene, 2-acetoxy butadiene, or the like. The diolefinic monomer can be present in amounts as low as about 5% of the grafting monomers, and it is often desirable to employ the diolefinic hydrocarbons in amounts of from 60 to 100% of the grafting monomer.

Other grafting monomers which are suitably employed include the vinyl carboxylic esters, citraconamates, itaconamates, fumaramates, maleamates, citraconamides, itaconamides, fumaramides, maleamides, vinyl pyridines, styrene and substituted styrenes, and the like. Minor amounts of acrylonitrile or substituted acrylonitrile, acrylamides, vinyl chloride, vinylidene chloride, and the like can also be used in the grafting monomer mixtures.

The vinyl carboxylic esters which are employed preferably are those of the formula $$CH_2=CH-O-\underset{\underset{O}{\|}}{C}-R_1$$

wherein $R_1$ is an alkyl group containing from 1 to 9 carbon atoms. Typical esters which can be employed in practicing the invention include vinyl formate, vinyl acetate, vinyl propionate, vinyl butyrate, vinyl 2-ethyl hexanoate, and the like. The vinyl esters can form any part or all of the grafting monomer and are desirably employed in amounts of at least 50% by weight of the total weight of grafting monomers. As with all of the olefinic monomers set out herein, one or more of the vinyl esters may be employed.

A particularly useful group of grafting monomers are the methacrylates of the formula

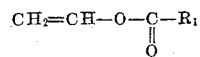

wherein $R_2$ is an alkyl group of from 1 to 8 carbon atoms. Typical methacrylates which are suitably employed include methyl methacrylate, ethyl methacrylate, propyl methacrylate, n-butyl methacrylate, isobutyl methacrylate, hexyl methacrylate, octyl methacrylate, and the like. In the various esters described herein the alkyl groups can be either straight or branched-chain groups as desired.

The citraconamates which can be used are represented by the following formulas:

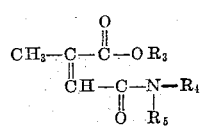

and

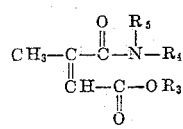

wherein $R_3$, $R_4$ and $R_5$ are hydrogen or alkyl groups of 1 to 4 carbon atoms. Typical citraconamates which are suitable include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N,N-dimethyl methyl citraconamate, N,N-diethyl ethyl citraconamate, N,N-dimethyl n-butyl citraconamate, the N,N-dibutyl methyl citraconamates, and the like.

The acrylamides which can be employed as a minor constituent of the grafting monomer include any of those of the formula

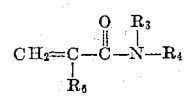

wherein $R_6$ is either hydrogen or a methyl group, and $R_3$ and $R_4$ are as defined above. Typical acrylamides include acrylamide, N-methyl acrylamide, N-ethyl acrylamide, N-isopropyl acrylamide, N-n-butyl acrylamide, methacrylamide, N-methyl methacrylamide, N-ethyl methacrylamide, N-isopropyl methacrylamide, N,N-dimethyl acrylamide, N,N-diethyl acrylamide, N,N-dimethyl methacrylamide, ethacrylamide, N-methyl ethacrylamide, α-propyl acrylamide, N-methyl-α-butyl acrylamide, etc.

As maleamides, we can advantageously use those represented by the following general formula:

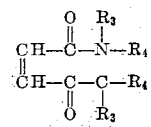

wherein $R_3$ and $R_4$ are as above defined. Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N',N'-diethyl maleamide, etc.

As fumaramides, we can advantageously use those represented by the following general formula:

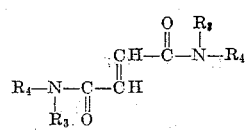

wherein $R_3$ and $R_4$ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'-butyl fumaramide, N,N'-tetramethyl fumaramide, N,N'-tetraethyl fumaramide, N,N-dimethyl-N',N'-diethyl fumaramide, etc.

As itaconamides, we can advantageously use those represented by the following general formula:

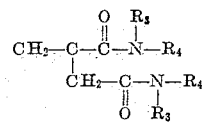

wherein $R_3$ and $R_4$ are as above defined. Typical itaconamides include itaconamide, N-methyl itaconamide, N-ethyl itaconamide, N-n-butyl itaconamide, N,N'-dimethyl itaconamide, N,N'-diethyl itaconamide, the N,N'-butyl itaconamides, N,N'-tetramethyl itaconamide, etc.

As citraconamides, we can advantageously use those represented by the following general formula:

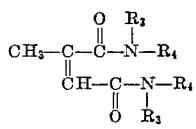

wherein $R_3$ and $R_4$ are as above defined. Typical citraconamides include citraconamide, N-methyl citraconamide, N-ethyl citraconamide, N-n-butyl citraconamide, N,N'-dimethyl citraconamide, N,N'-diethyl citraconamide, the N,N'-butyl citraconamides, N,N'-tetramethyl citraconamide, etc.

The maleamates whose polymers we can advantageously use comprise those represented by the following general formula:

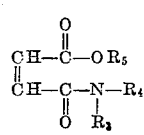

wherein $R_3$, $R_4$ and $R_5$ are as above defined. Typical maleamates include methyl maleamate, ethyl maleamate, propyl maleamate, n-butyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously use those represented by the following general formula:

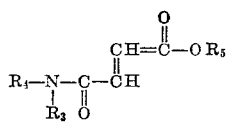

wherein $R_3$, $R_4$ and $R_5$ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, we can advantageously use those represented by the following general formulas:

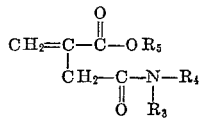

and

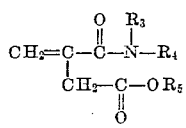

wherein $R_3$, $R_4$ and $R_5$ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamate, etc.

The styrene monomers which are suitable for use include styrene, α-methyl styrene, p-acetamino styrene, p-methyl styrene, α-acetoxy styrene, and the like.

The vinyl pyridines which are suitably employed include 2-vinyl pyridine, 2-vinyl-5-methyl pyridine, 2-methyl styrene, α-acetoxy styrene, and the like.

Other olefinic monomers containing an ethylenic or vinylic unsaturation are known in the art, and any of such polymerizable monomers are suitable for use in practicing the invention within the limits herein defined. The preparation of the graft polymers of this invention can be carried out either batchwise or in continuous fashion wherein the grafting monomer and a solution of the preformed polymer are continuously added to a reactor as in a continuous batch process or where product is also continuously withdrawn from a continuously circulating process.

In the polymers of this invention, the preformed acrylamidic polymer is present in an amount of from 20 to 80% of the entire polymer, and preferably in an amount of from 20 to 60% of the total polymer. When the major portion of the grafting monomer is an acrylate, films having excellent vapor transmission characteristics are obtained with acrylamidic contents up to 60% of the total polymer. With other grafting monomers, the preformed acrylamidic polymer is desirably within the range of 20 to 40% of the total polymer for good vapor transmission characteristics. These polymers which have the characteristic of transmitting water vapor do not permit the passage of liquid water and hence are particularly useful for coating textile fabrics and leather to be used in the manufacture of waterproof clothing, footwear, and the like. The rubber-like polymers derived from the butadienes are especially valuable for this purpose. The polymers containing higher amounts of preformed acrylamidic polymer, as, for example, from 50 to 80% by weight, tend to swell in water and are permeable to the diffusion of salts and other water-soluble materials. These compositions are particularly useful as gelatin substitutes in photographic processes, with either black-and-white or color emulsions. They can also be used as sizing agents for textiles and papers, as thickening agents, as detergent additives, and the like. The polymers embodying the invention are particularly valuable as textile sizing agents because they show excellent adhesion to a wide variety of natural and synthetic fibers.

The invention is illustrated by the following examples of preferred embodiments thereof. These examples are included for purposes of illustration and are not intended to limit the scope of the invention unless otherwise specifically indicated.

*Example 1*

Twenty-five grams of polyacrylamide is dissolved in 300 cc. of water and the following materials are added:

|   | G. |
|---|---|
| Methylacrylate | 75.0 |
| Divinylbenzene | 0.5 |
| Sodium dodecyl sulfate | 0.8 |
| Potassium persulfate | 1.0 |
| Sodium bisulfite | 0.5 |

The mixture is stirred at 50–60° C. for 4 hours. A viscous, opaque emulsion is obtained. One gram of trimethylol melamine and 0.1 g. of diammonium hydrogen phosphate are added to cross-link the polyacrylamide. The emulsion is coated on a glass plate and heated at 100–110° C. to evaporate the water. A clear, tough, elastic film is obtained. This film is not dissolved by water, acetone, or benzene. It has a high capacity for transmitting water vapor.

*Example 2*

One hundred grams of polymethacrylamide is dissolved in 1000 cc. of water and the following materials are added:

|   | G. |
|---|---|
| Butylacrylate | 100.0 |
| Ethylacrylate | 100.0 |
| Allylacrylate | 1.0 |
| Sodium octadecyl sulfate | 2.0 |
| Sodium persulfate | 2.0 |
| Sodium bisulfite | 2.0 |

The mixture is stirred at 50–55° C. for 6 hours. A smooth, viscous emulsion is obtained. Five grams of dimethylol urea and 0.3 g. of diammonium phosphate are added as cross-linking agent for the polymethacrylamide. Cellulose acetate fabric is padded with the emulsion to give a coating of 2.0–2.5 ounces per yard, on a dry basis. The coated cloth is dried at 110° C. The coated fabric shows a water vapor transmission rate of 60–70% of the untreated fabric. It holds a hydrostatic head of 6 feet of water.

*Example 3*

Eighty grams of N-isopropylacrylamide and 20 g. of acrylic acid are dissolved in 1200 cc. of water and 1.0 g. of potassium persulfate and 0.5 g. of dodecyl mercaptan are added. The solution is heated at 50–60° C. for 24 hours to give a copolymer of the amide and acid. Sufficient sodium carbonate is added to neutralize the carboxyl groups in the polymer and produce a clear, viscous solution.

The following materials are added to the solution:

|  | G. |
|---|---|
| Ethylacrylate | 100.0 |
| Vinyl acetate | 20.0 |
| Ammonium persulfate | 1.6 |
| Sodium bisulfite | 1.0 |

The mixture is stirred at 60–65° C. for 8 hours to give an emulsion. Six grams of trimethylol melamine and 0.3 g. of oxalic acid are added to the emulsion in order to cross-link the polyamide. This emulsion is coated on leather to give a dry-weight deposit amounting to 3 ounces per square yard. The coated leather is then dried at 110° C. The final product has a high transmission rate for water vapor but is impermeable to liquid water.

*Example 4*

One hundred grams of poly N-methylmethacrylamide is dissolved in 2000 cc. of water and the following materials are added:

|  | G. |
|---|---|
| Isobutylacrylate | 325.0 |
| N-methylmethacrylamide | 75.0 |
| Sulfonated mineral oil | 3.0 |
| Ammonium persulfate | 5.0 |
| Sodium persulfate | 3.0 |

The mixture is stirred at 50–55° C. for 6 hours. A smooth, stable emulsion is obtained. Five grams of urea-formaldehyde prepolymer and 0.5 g. of diammonium phosphate are added and the emulsion is coated on nylon sharkskin fabric to give a dry-weight deposit of 3.5 ounces per square yard. The fabric is dried at 110° C. The coated fabric has a water vapor transmission rate that is 70–75% of the uncoated fabric. The coated fabric will hold a hydrostatic head of 6 feet of water.

*Example 5*

A copolymer is made having the composition: 70% N-methylacrylamide—30% N-butylacrylamide. One hundred grams of the copolymer is dispersed in 2500 cc. of water and the following materials are added.

|  | G. |
|---|---|
| 2-ethylhexylacrylate | 120.0 |
| Methoxyethyl methacrylate | 80.0 |
| Sodium salt of dodecyl benzene | 2.0 |
| Ammonium persulfate | 2.5 |

The mixture is stirred at 60° C. for 4 hours. This composition is useful for coating cloth and leather.

*Example 6*

A copolymer is made having the composition: 65% N-ethylacrylamide—35% N,N-dimethyl-acrylamide. One hundred parts of the polymer is dissolved in 400 parts of β-methoxyethanol. Seventy-five parts of methylacrylate and 1.0 part of benzoyl peroxide are added. The solution is heated at 60–70° C. for 20 hours. A clear, viscous solution is obtained. Films were coated on glass plates and the solvent was evaporated at 90–100° C. A clear film was produced. This film is permeable to ions and can be used as a gelatin substitute.

*Example 7*

Ten g. polyacrylamide was dissolved in 100 cc. of water and the following materials were added.

|  | G. |
|---|---|
| Vinyl acetate | 10.0 |
| Potassium persulfate | 0.1 |
| Sodium dodecyl sulfate | 0.2 |

The mixture was stirred at 50° C. for 12 hours to produce a stable emulsion of polyvinyl acetate. The emulsion was coated on glass plates and the water was evaporated at 70–80° C. to give a clear film that showed very strong adhesion to the glass. This product is useful as a gelatin substitute in photography.

*Example 8*

Ten g. polymethacrylamide was dissolved in 100 cc. of water and the following materials were added.

|  | G. |
|---|---|
| Methyl methacrylate | 25.0 |
| Ammonium persulfate | 0.2 |
| Sodium octadecyl sulfate | 0.4 |

The mixture was stirred at 55–60° C. for 8 hours. A stable emulsion was obtained. Evaporation of the water produced a clear film that showed only a limited swelling when imersed in water. This material is useful as a sizing agent for paper. It is also useful as a gelatin substitute because it is permeable to salt solutions.

*Example 9*

Ten g. of N-methyl methacrylamide was dissolved in 100 cc. of water along with 0.1 g. sodium persulfate and 0.1 g. sodium bisulfite. The solution was stirred at 30–35° C. for 8 hours to produce a solution of poly N-methyl methacrylamide. The following materials were added to the solution.

|  | G. |
|---|---|
| Butyl methacrylate | 10.0 |
| Octyl methacrylate | 10.0 |
| Sulfonated mineral oil | 0.4 |
| Divinyl benzene | 0.1 |
| Sodium persulfate | 0.3 |

The mixture was stirred at 60° C. for 6 hours. A smooth, uniform emulsion was obtained. In order to improve the resistance of the film to water, 0.5 g. trimethylol melamine and 0.1 g. diammonium hydrogen phosphate were added to the emulsion. Cellulose acetate cloth was coated with the emulsion to give a dry weight application of 2.0 ounces per square yard. The cloth was then dried at 110° C. The coated cloth showed a high transmission rate for water vapor but was impermeable to liquid water. The emulsion can also be used for the treatment of leather.

*Example 10*

Ten g. N-isopropyl acrylamide and 3 g. acrylic acid were dissolved in water, along with 0.2 g. ammonium persulfate. The solution was heated at 50° C. to produce a copolymer of the amide and acrylic acid. The following materials were added to the solution:

|  | G. |
|---|---|
| Vinyl acetate | 25.0 |
| Diethyl fumarate | 25.0 |
| Potassium persulfate | 0.4 |
| Sodium octadecyl sulfate | 1.0 |

The mixture was stirred at 60° C. for 10 hours. The emulsion was coated on paper and dried at 110° C. A smooth, hard glaze was produced on the paper surface.

*Example 11*

A copolymer was prepared from 1 part acrylamide and 2 parts N,N-dimethyl acrylamide. One hundred g. of the copolymer was dissolved in 400 cc. of water and the following materials were added.

| | G. |
|---|---|
| Styrene | 20.0 |
| Sulfonated olive oil | 0.3 |
| Ammonium persulfate | 0.2 |

The mixture was stirred at 65° C. for 3 hours. This product is useful as a sizing agent for textile fibers.

*Example 12*

Ten g. of N-ethyl methacrylamide polymer was dissolved in 100 cc. of water and the following materials were added.

| | G. |
|---|---|
| n-Butyl vinyl ether | 5.0 |
| Acrylic acid | 5.0 |
| Potassium persulfate | 0.1 |
| Sulfonated mineral oil | 0.2 |

The mixture was stirred at 60° C. for 8 hours. The acid groups in the polymer were neutralized by adding sodium carbonate. The product is valuable as a textile sizing agent. It shows good adhesion to synthetic fibers such as polyamides, polyacrylonitrile, polyesters, etc.

*Example 13*

A copolymer was made having the composition 1 part N-ethyl acrylamide+1 part acrylamide. Ten g. of the copolymer was dissolved in 150 g. of water and the following materials were added.

| | G. |
|---|---|
| Vinyl 2-ethyl hexanoate | 25.0 |
| Dibutyl maleate | 5.0 |
| Sodium dodecyl sulfate | 0.8 |
| Potassium persulfate | 0.4 |

The mixture was stirred at 60° C. for 20 hours. An emulsion was obtained. This product is useful for coating fabrics and leather, as described in Example 9. The coated materials will transmit water vapor but will not allow the passage of liquid water.

*Example 14*

Ten g. of n-butyl methacrylamide and 0.1 g. benzoyl peroxide were dissolved in 100 cc. of ethyl alcohol. The solution was heated at 60° C. for 20 hours. A viscous solution of poly-n-butyl methacrylamide was produced. Ten g. of butyl methacrylate and 0.1 g. benzoyl peroxide were added to the solution and the mixture was heated at 60° C. for 24 hours. Films coated from the solution were clear and tough. They had a high transmission rate for water vapor but were impermeable to liquid water.

*Example 15*

Ten g. of poly N-isopropylacrylamide was dissolved in 100 cc. of water and the following materials were added.

| | G. |
|---|---|
| Butadiene | 7.0 |
| Styrene | 3.0 |
| Sodium dodecyl sulfate | 1.0 |
| Potassium persulfate | 0.1 |
| Sodium bisulfite | 0.1 |

The mixture was agitated in a pressure bottle at 35° C. for 12 hours. The resultant stable emulsion was coated on glass plates and the water evaporated at 80–90° C. to give a clear film. The resultant film was very tough and permeable to water.

Similar results are obtained with any of the other polymeric compositions as defined herein. The invention thus provides a ready method for preparing tough, flexible films which readily transmit water vapor without allowing the passage of liquid water. Such polymers permit the manufacture of waterproof fabrics which have the capacity to "breathe" whereby the discomfort attendant to most waterproof fabrics is largely overcome. By a suitable choice of composition, a class of polymeric materials which can serve as gelatin substitutes, additives or extenders in photographic processes is provided. Such materials are compatible with gelatin and can serve in any of the applications wherein gelatin is ordinarily employed including use in the photographic emulsions carrying light-sensitive materials such as the silver halides. By the use of suitable cross-linking or hardening agents for the acrylamidic preformed polymer, the water insolubility of the final product is enhanced. Similarly, divinyl cross-linking agents can be employed for imparting solvent resistance to the final polymer by cross-linking the portion of the graft copolymer built up during the grafting step.

The invention thus offers a solution to problems which have faced the workers in the polymeric arts for many years. The utility of the polymers is greatly extended, and it is possible by a suitable choice of ingredients to prepare products having closely controlled properties within desired ranges of physical and chemical characteristics.

Although the invention has been described in detail with particular reference to certain preferred embodiments thereof, variations and modifications can be effected within the spirit and scope of the invention as described hereinabove and as defined in the appended claims.

This application is a continuation of Serial No. 444,648, filed July 20, 1954 (now abandoned).

We claim:

1. Polymeric material capable of freely transmitting water vapor while preventing the passage of liquid water and being the graft copolymer of a mixture of (1) a homopolymer of a monomer of the formula:

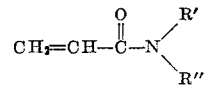

wherein R′ and R″ are selected from the group consisting of hydrogen and alkyl groups of 1 to 4 carbon atoms, (2) a monomeric alkyl acrylate wherein the alkyl group contains 1 to 8 carbon atoms and (3) a cross-linking agent selected from the group consisting of divinyl benzene, allyl acrylate and diallyl phthalate, said homopolymer and said acrylate being present in said graft copolymer in the weight ratio of 20 to 60% of the said homopolymer to 80 to 40% of the said acrylate, and said cross-linking agent being present in said graft copolymer in an amount of 0.5 to 15% based on the weight of the said homopolymer.

2. The polymeric material according to claim 1 wherein the said homopolymer is polyacrylamide, wherein the said acrylate is methyl acrylate and wherein the said cross-linking agent is divinyl benzene.

3. Polymeric material capable of freely transmitting water vapor while preventing the passage of liquid water and being the graft copolymer of mixture of 25 parts by weight of polyacrylamide, 75 parts by weight of methyl acrylate and 0.5 part by weight of divinyl benzene.

4. A process for preparing polymeric material capable of freely transmitting water vapor while preventing the passage of liquid water which comprises heating at 30 to 120° C. an aqueous mixture comprising (1) a homopolymer of a monomer of the formula:

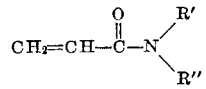

wherein R′ and R″ are selected from the group consisting of hydrogen and alkyl groups of 1 to 4 carbon atoms, (2) a monomeric alkyl acrylate wherein the alkyl group contains 1 to 8 carbon atoms, (3) a cross-linking agent selected from the group consisting of divinyl benzene, allyl acrylate and diallyl phthalate and (4) a peroxide polymerization catalyst, said homopolymer and said acrylate being present in said mixture in the weight ratio of 20 to 60% of the said homopolymer to 80 to 40% of the said acrylate, and said cross-linking agent being present in said mixture in an amount of 0.5 to 15% based on the weight of the said homopolymer.

5. The process according to claim 4 wherein the said homopolymer is polyacrylamide, wherein the said acrylate is methyl acrylate and wherein the said cross-linking agent is divinyl benzene.

6. A process for preparing polymeric material capable of freely transmitting water vapor while preventing the passage of liquid water which comprises heating at 30 to 120° C. an aqueous mixture comprising 25 parts by weight of polyacrylamide, 75 parts by weight of methyl acrylate and 0.5 part by weight of divinyl benzene, in the presence of a peroxide polymerization catalyst.

References Cited in the file of this patent

UNITED STATES PATENTS

| | | |
|---|---|---|
| 2,155,590 | Garvey | Apr. 25, 1939 |
| 2,597,439 | Bodamer | May 20, 1952 |
| 2,614,089 | Harrison et al. | Oct. 14, 1952 |
| 2,649,434 | Coover et al. | Aug. 18, 1953 |
| 2,666,042 | Nozaki | Jan. 12, 1954 |

OTHER REFERENCES

Whitby: "Synthetic Rubber," pages 16–17, published by Wiley, New York (1954).